United States Patent [19]

Maurer

[11] 3,918,633

[45] Nov. 11, 1975

[54] PAPER TAPE TO JACQUARD CARD REPEATER HEAD

[75] Inventor: Gottfried Maurer, Needham, Mass.

[73] Assignee: Gessner A.G., Waedenswil, Switzerland

[22] Filed: Dec. 26, 1973

[21] Appl. No.: 427,827

[52] U.S. Cl. .................... 234/79; 234/89; 139/319; 235/61.11 B

[51] Int. Cl.$^2$ ........................ G06K 1/18; G06K 7/04; D03C 17/06; G06K 1/02

[58] Field of Search .............235/61.11 B, 61.12 R, 61.11 A, 235/61.11 R, 61.1; 139/59, 319; 340/172.5, 147 R; 234/14, 35, 36, 79, 89

[56] References Cited

UNITED STATES PATENTS

| | | | |
|---|---|---|---|
| 1,298,400 | 3/1919 | Reynolds | 235/61.12 R |
| 1,983,354 | 12/1934 | English | 235/61.11 B |
| 2,580,270 | 12/1951 | Baigley | 235/61.11 E |
| 2,768,691 | 10/1956 | Cooper | 235/61.12 R |
| 3,128,372 | 4/1964 | Braun | 235/61.11 B |
| 3,182,992 | 5/1965 | Braun | 235/61.11 B |
| 3,208,041 | 9/1965 | Swenson | 340/147 R |
| 3,509,323 | 4/1970 | Daniels | 235/61.1 |
| 3,525,855 | 8/1970 | Azuma | 235/61.11 A |
| 3,671,944 | 6/1972 | Dubner | 340/172.5 |
| 3,735,093 | 5/1973 | Kendall | 235/61.1 |
| 3,744,035 | 7/1973 | Gierhos | 139/319 |

*Primary Examiner*—Daryl W. Cook
*Assistant Examiner*—Robert M. Kilgore
*Attorney, Agent, or Firm*—Richard L. Stevens

[57] ABSTRACT

The reading head of a Jacquard repeater is modified to read weave information punched on standard computer tape. The sensing needles are flexibly extended. Upper and lower needle guide plates are provided having perforations corresponding to the standard punched computer tape format. The tape is indexed by a servo motor which provides controlled acceleration and deceleration. The tape is then precisely positioned by stepping motors. Subsequently, the weave information is sensed and punched on a Jacquard card.

13 Claims, 13 Drawing Figures

PAPER TAPE TO JACQUARD CARD REPEATER HEAD

BACKGROUND OF THE INVENTION

Jacquard weaving is a style of weaving in which every thread in the warp is individually controlled, enabling an endless variety of highly complex patterns to be generated. The threads in the loom are controlled by Jacquard cards (Cards) via a mechanical reader/actuator. Each Card consists of an array of 1,344 possible holes, which holes define the weave pattern. The presence or absence of a hole determines whether the associated thread(s) is up or down for that particular shuttle pass or pick. The Cards are normally produced by a highly skilled team of personnel who are trained to convert the original artist's sketch into the required pattern of holes. Often the pattern is symmetrical and repetitive, and only one segment of it is hand cut. The remainder of the pattern is produced by a repeater machine. The Jacquard repeater utilizes the same mechanical reader/actuator as the loom, except instead of operating threads on the loom, it operates 1,344 punches which duplicate an input Card. The repeater is used for many purposes. In mirror image patterns only half need be manually punched. After one pass through the repeater, the input Card is turned over and a second pass made which is the mirror image of the first pass producing the complete pattern. The input Cards may be formed into an endless loop and a continuously repeating output will be generated. Two Cards may be superimposed on the input to generate the output allowing special variations to be obtained in a standard background weave.

When more than one loom is to be run on the same pattern and also to prevent damage or loss of a valuable master pattern, the repeater is used to make copies of Cards for use in the weaving mill.

The advent of computerized Card cutting systems has brought to light the problem of adapting the very high speed potentials of the computer to the low speed operation of the typical Card cutting machine. A typical Card cutting machine after being modified with various actuator solenoids and motors still only runs at about 1 pick per 20 seconds. A repeater, on the other hand, runs at about 1–2 picks per second, 20 to 40 times faster. The standard Jacquard repeater is a mechanical batch reader/punch reading 1,344 possible hole locations simultaneously on an "input" Card and punching a duplicate. These 1,344 possible hole locations are probed by 1,344 fine wires or sensing needles. If a hole is present the needles pass through unopposed. If a hole is not present, the needle is pushed up lifting a punch actuator clear of a striker. The striker then moves inwardly and all those actuators which have not been moved clear, i.e., no corresponding holes, drive corresponding punches which duplicate the hole pattern. The proper operation of this reader depends upon the holes in the input Card being read and maintained within specific tolerances.

SUMMARY OF THE INVENTION

The invention is broadly directed to an apparatus and method for a computer tape feed mechanism for a Jacquard repeater. The invention is directed to a method and apparatus which modifies the reading head of a standard Jacquard repeater by providing a reading head which may read weave information which has been placed on a tape medium such as standard computer tape. More particularly, the invention is directed to a method and apparatus wherein tape having weave information therein is moved at a high speed through a repeater and in information transfer relationship with the punches and the information transferred to the Card in timed sequence.

In a preferred embodiment, a punched paper tape is indexed and positioned in register with modified sensing needles of the repeater. The sensing needles found in the repeater are adapted to sense and read weave information on standard punched paper tape.

In one aspect of the invention the sensing needles of the repeater which are in an alternating offset pattern are adapted to read the parallel aligned patterns of weave information incorporated into standard computer punched paper tape. The sensing needles of a standard Jacquard repeater are elongated to provide flexibility.

The sensing needles of the standard repeater are arranged in an alternating staggered row or offset relationship, as is well known. The needles are adapted to press through a first perforated plate, the perforations in register with the offset alternating configuration of the needles.

In the preferred embodiment of the invention, a second plate is spaced apart from and in parallel relationship with the first plate. The second plate is characterized by a plurality of perforations, which perforations are aligned in uniform relationship. The perforations of the second plate are in register with the perforations of a third guide plate, which third guide plate supports the tape. Thus, the perforations of the second and third plates are in register and are spaced or dimensioned in accordance with a punched hole pattern which would be placed in a standard computer paper tape. The elongated sensing needles are received in the first plate, as is well known, and in accordance with the present invention are also received in the second plate in a slideable manner. When the sensing needles are released to probe the paper tape, they will slide within the first and second plates in which they are at all times received and slide through the holes where existing in the tape and through the perforations in the third plate which are in register with the holes.

In a further aspect of the invention in its preferred embodiment, a structure is provided to move the tape at a high speed through the repeater. The tape is indexed and positioned for each pick. The tape is rapidly accelerated and decelerated to index the tape. The positioning of the tape for the actual reading or pick is accomplished by incremental movement of the tape.

DESCRIPTION OF THE PREFERRED EMBODIMENT

Figure 1:
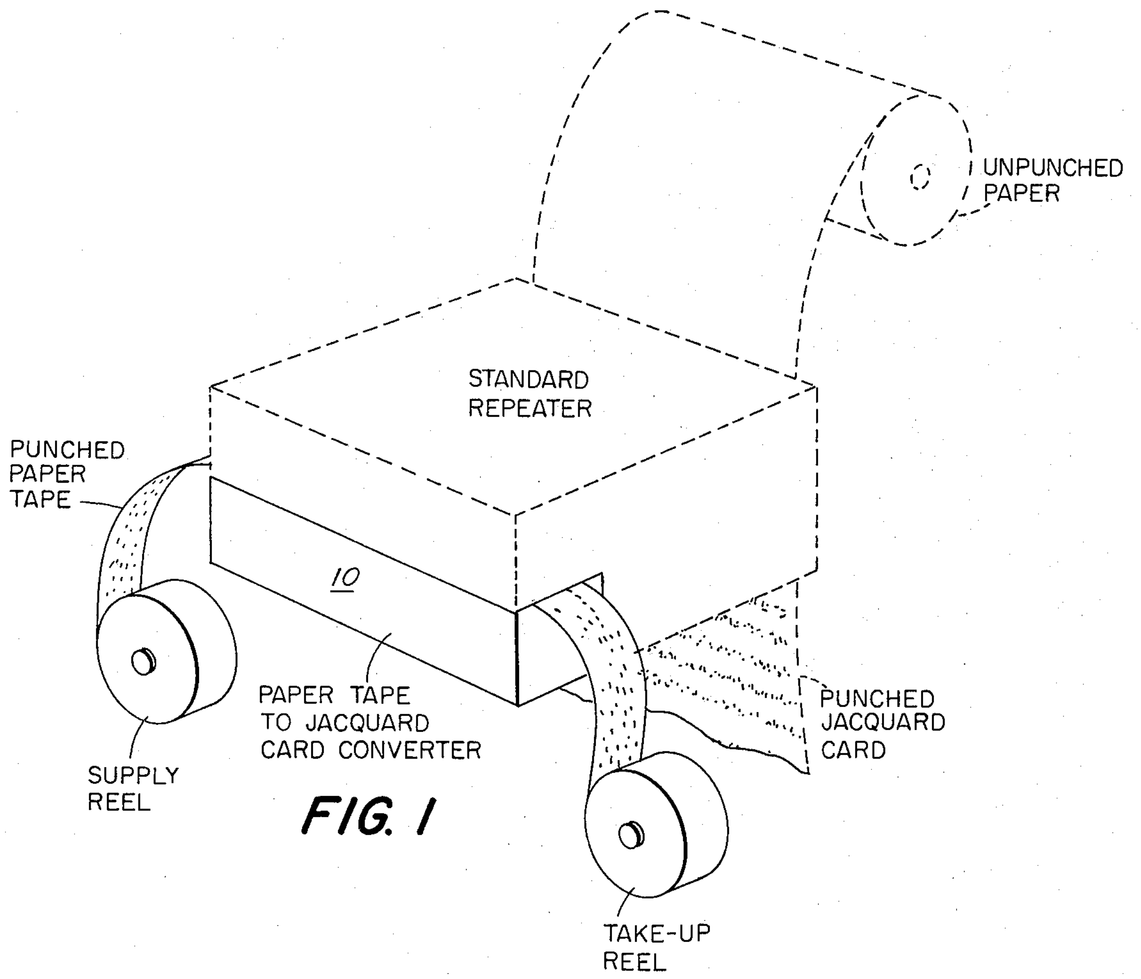
FIG. 1 is a perspective view of one embodiment of the invention.

Referring to FIG. 1, a modified Jacquard repeater including an improved reading head 10 embodying the invention is shown and which head 10 is adapted to prepare a Jacquard card from standard punched paper computer tape.

Paper Tape Positioning Mechanism

Figure 2:
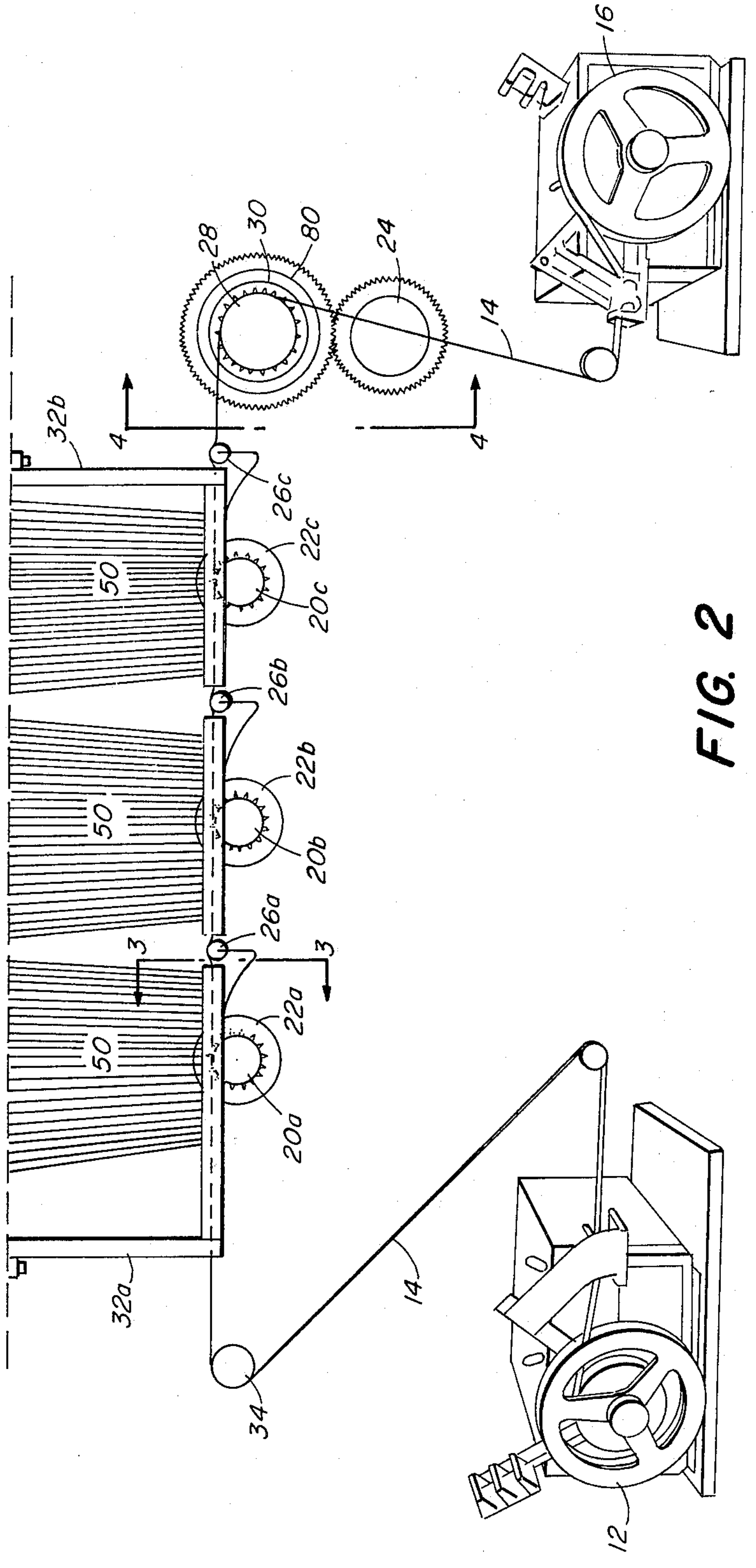
FIG. 2 is a front schematic view of the modified repeater head.

In FIG. 2 a schematic of the modified head 10 is shown. A supply reel assembly 12 supplies punched paper tape 14 to the head 10. The paper tape 14 is taken up on a reel assembly 16. The supply and reel assemblies are standard equipment, such as FACIT, Model 4015 (Sweden).

Figure 4:
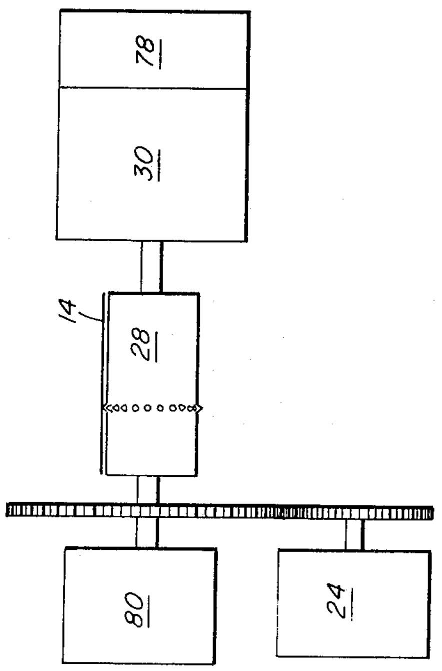
FIG. 4 is a side sectional view of FIG. 2 taken along line 4—4.

The sensing needles of a standard Jacquard repeater are modified as hereinafter described and divided into three equal groups. Three 24-toothed sprockets 20 *a, b,* and *c* driven by stepping motors 22 *a, b,* and *c* engage the tape 14. A fourth stepping motor 24 drives through a 5/3 gearing ratio a 40-toothed drive sprocket 28. The sprocket normally driven by a servo motor 30 engages the tape 14. This is most clearly shown in FIG. 4. The brackets which secure the servo motor 30 and stepping motor 24 to the repeater housing are not shown.

Bracket members 32 *a* and *b* are secured such as by bolting to the punch drive block of the repeater. A roller 34 is secured to the housing of the repeater to guide the tape after it leaves the supply reel assembly 12.

Figure 3:
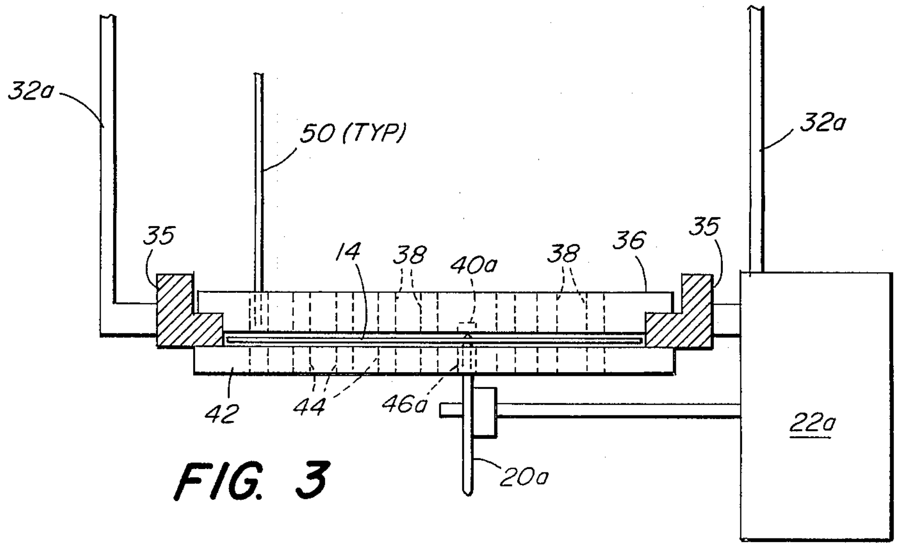
FIG. 3 is a side sectional view of FIG. 2 taken along line 3—3.
Figure 5:
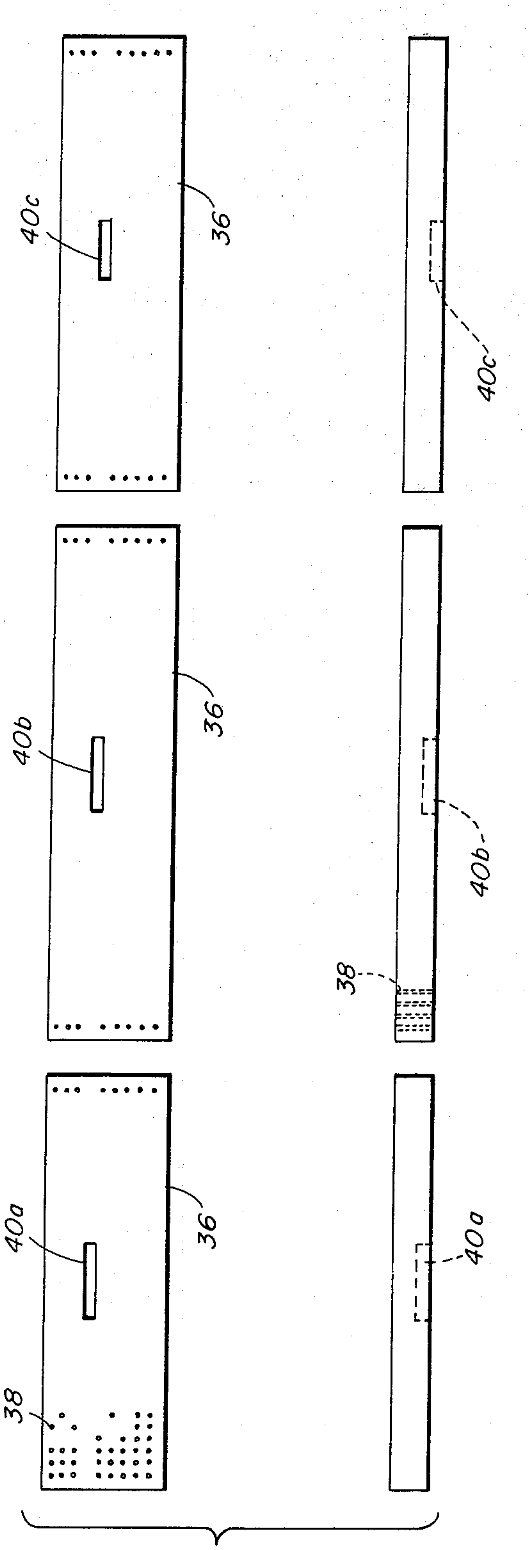
FIGS. 5 a and b are top and front views of the upper needle guide plate.

Referring to FIG. 3, the brackets 32 *a* are secured to needle guide mounting rails 35. Received fixedly in a channel defined by the shoulders of the rails such as by bolts (not shown) is an upper needle guide 36. The upper needle guide is characterized by a plurality of perforations 38 spaced as shown in FIG. 5. The perforations are grouped in threes, each group having 448 perforations. The spacings between successive groups is such that it will accomodate the tape in its shortest condition and will form a take-up loop in its longest condition. The dimensions of the perforations in the groups corespond to the hole pattern for a standard 1-inch eight-level tape as defined by American National Standards Institute (ANSI) or as defined by EIA Proposed Standard RS-227. The guide 36 has 3 wells 40 *a, b* and *c* on the bottom surface thereof in which the sprockets 20 *a, b,* and *c* are received.

Figure 6:
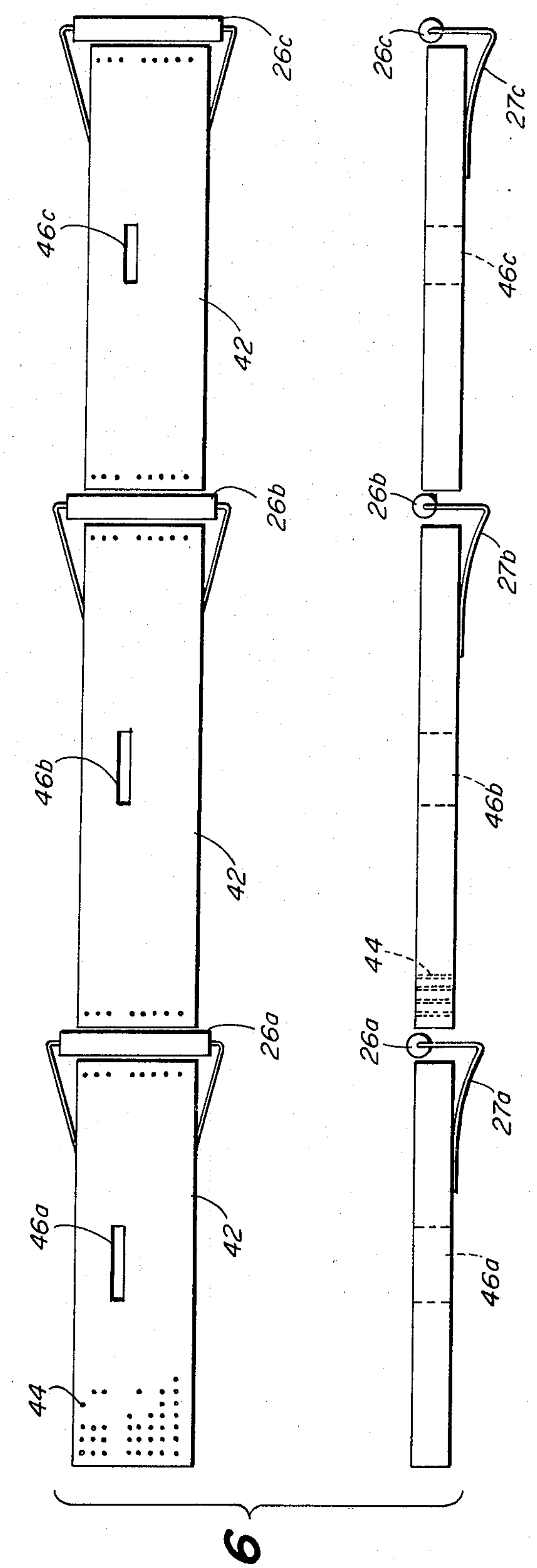
FIGS. 6 a and b are top and front views of the lower needle guide plate.

A lower needle guide 42 is secured to the lower surface of the mounting rails 35 such as by bolting. As shown, the upper surface of the lower needle guide 42 is spaced apart from the lower surface of the upper needle guide 36 to allow for the passage of the tape 14 therethrough. The lower needle guide 42, shown most clearly in FIG. 6, is characterized by a plurality of perforations 44 grouped and in register with the perforations 38 of the upper needle guide. The guide 42 is also characterized by three slots 46 *a, b,* and *c* in which the sprocket wheels 20 *a, b,* and *c* are received. The slots are most clearly seen in FIG. 6. Tensing rollers 26 *a, b* and *c* are secured by a spring 27 *a, b* and *c* to the bottom surface of the guide 42. The rollers 26 engage and tension the tape 14 forming the take-up loop if required.

Figure 7:
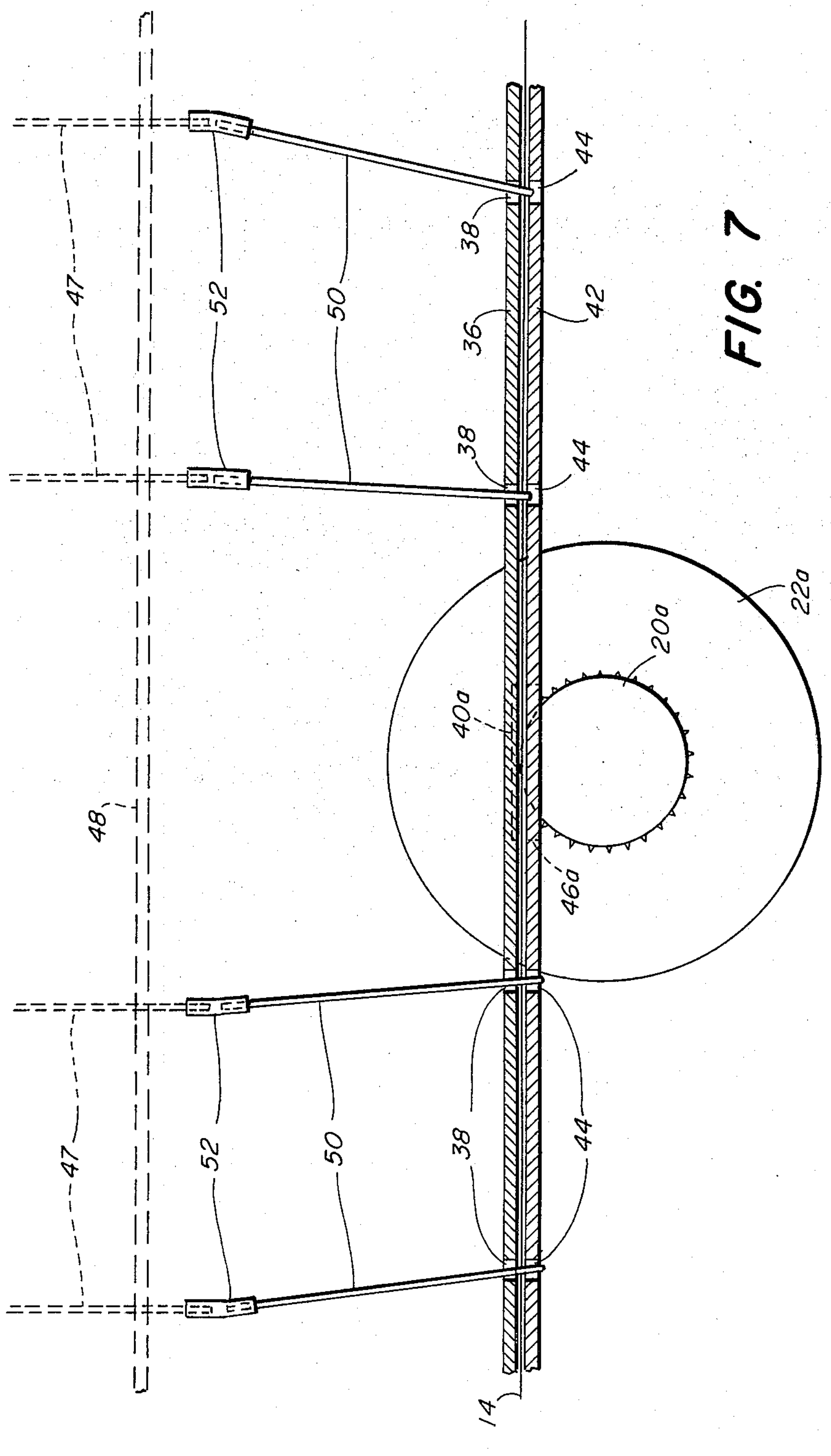
FIG. 7 is a partially schematic and partially sectional view of the modified sensing needles of the invention.

In FIG. 7, in exaggerated form, a plurality of needles 47 are shown passing through a standard Jacquard repeater sensing needle guide 48. Second sensing needles 50 are secured to the needles 47 by shrink tube couplings 52, such as 3/64 inch diameter heat shrinkable polyolefin flexible tubing. The needles 50 are received in perforations 38 in a slideable manner and are thus aligned to sense the holes in the tape 14.

Positioning Mechanism Control Circuit

Figure 8:
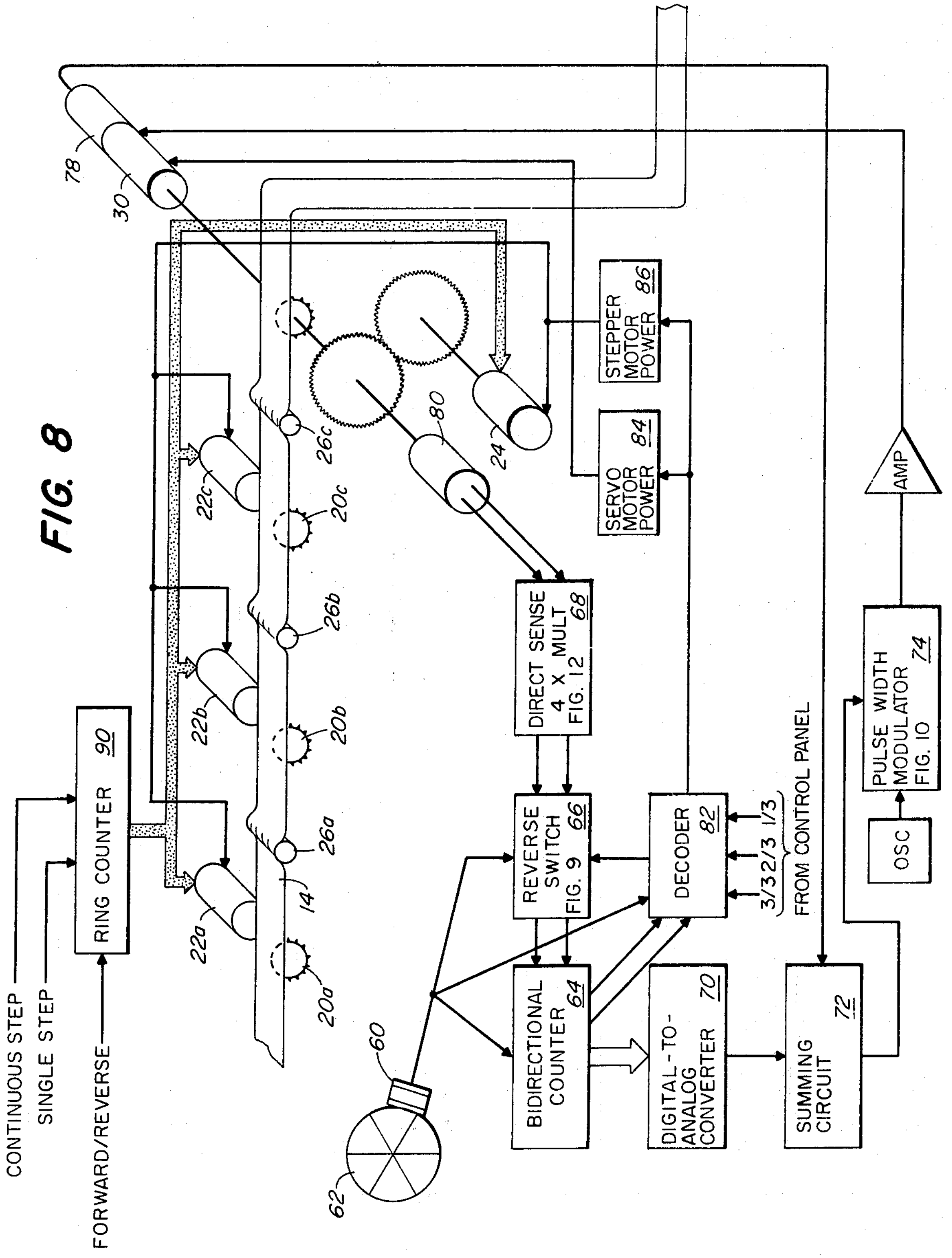
FIG. 8 is a block diagram of the circuit used in the preferred embodiment.

The control circuit for indexing and positioning the tape 14 is shown in FIG. 8 in block diagram. A magnetic proximity switch 60 is activated by a magnet attached to the machine's flywheel 62. The magnet position is chosen to cause switch activation just after the sensing needles 50 have cleared the paper tape 14 at completion of a read/punch cycle, as is standard with a Jacquard repeater.

The switch 60 causes a bidirectional counter 64 to be set to a count of one and a reversing switch 66 preceding it to be set for up-counting; and through decoder 82 activates power supply 84 and turns off power supply 86.

The bidirectional counter is designed to count up to 1,800 (decimal) and back down to zero, and comprises three bidirectional 4-bit binary counters (such as 74,193) in cascade with the most significant bit of the last counter ignored to obtain 11 bits.

Figure 9:
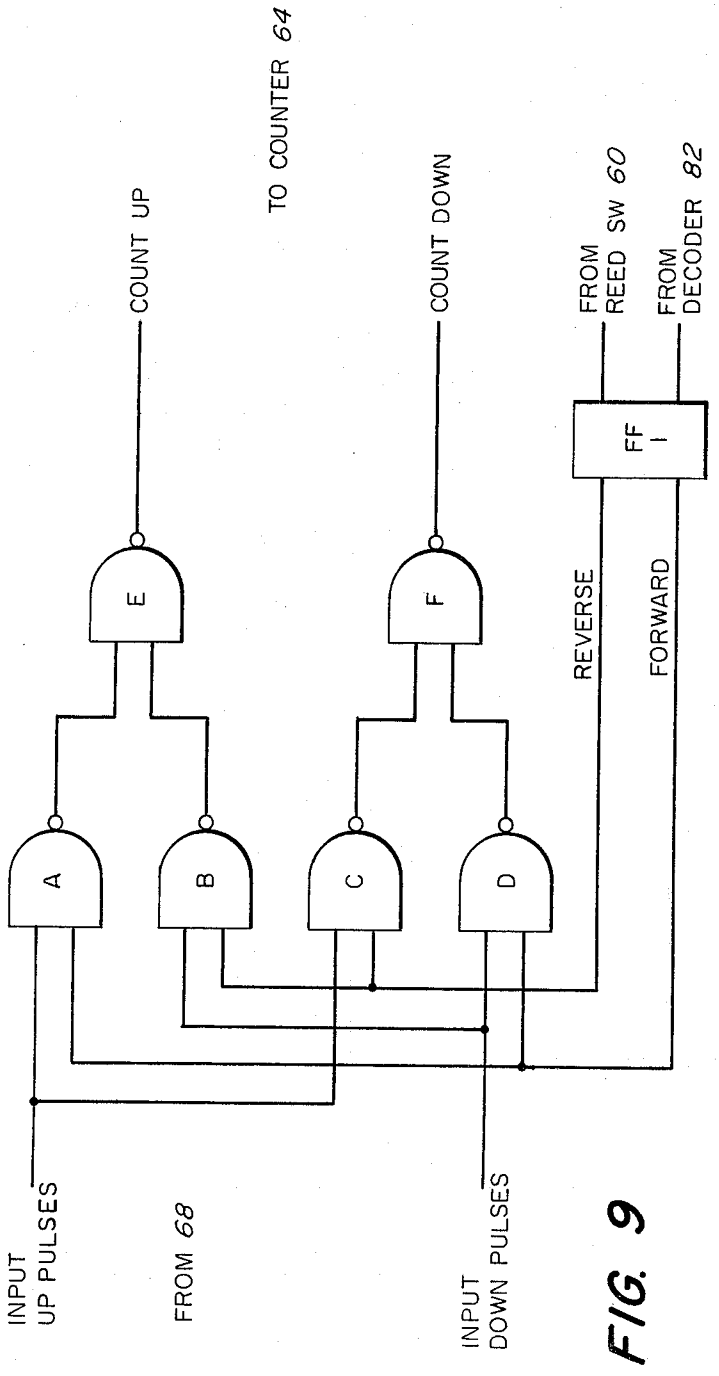
FIG. 9 is a schematic of a reversing switch.

The reversing switch is implemented with 2-input "nand" gates (such as 7,400) arranged as shown in FIG. 9.

When the "FORWARD" input is high and "REVERSE" is low, gates A and D are enabled and gates B and C are disabled. Up and down pulses from a direction sense X 4 multiplier 68, pass straight through to the count up and count down outputs respectively. When the FORWARD is low and the REVERSE is high, up pulses are routed to the count down output and down pulses are routed to the count up output. Gates E and F function as negative input "nor" gates. The result is an electronic equivalent of a standard mechanical reversing switch. It may be implemented with any circuit that provides two wide 2-input and-or logic operation. The bidirectional counter 64 drives a digital-to-analog converter 70, the output of which is applied to summing circuit 72.

The digital-to-analog converter 70 (such as Motorola MC 1408L7) generates an output voltage proportional to the binary value of the digital input received from the bidirectional counter 64.

Figure 10:
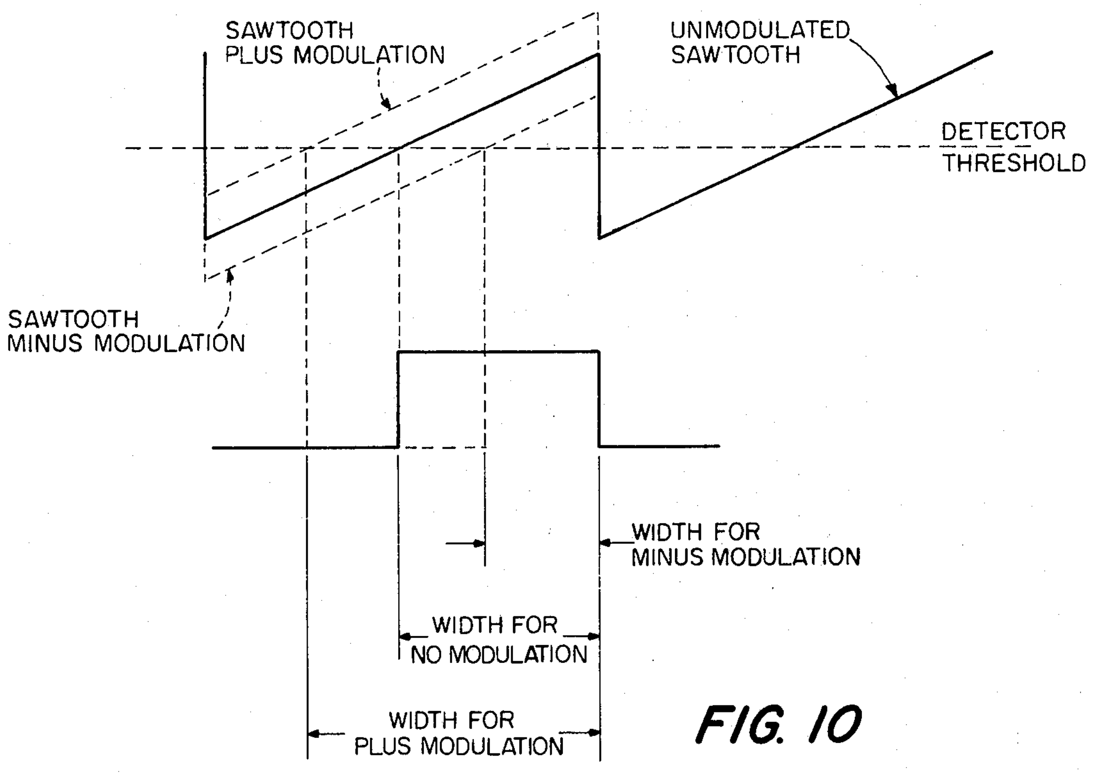
FIG. 10 is an illustration of the signals generated by the pulse width modulator.

The summing circuit 72 is a standard operational amplifier in a normal voltage summer configuration. The output of the summing circuit 72 is received by a pulse width modulator 74, which is a standard circuit where the modulating signal is summed with a sawtooth causing an earlier or later crossing of a detector threshold to initiate the pulse. The pulse is always terminated at the completion of the sawtooth as illustrated in FIG. 10. The output of the modulator 74 is amplified to sufficient power to drive the servo motor 30.

The motor 30 causes as associated tachometer 78 to generate an output voltage proportional to speed. The tachometer output is applied to the summing circuit 72 and the feedback loop thus formed causes the motor 30 to turn at a speed which makes the outputs of the digital-to-analog converter 70 and tachometer 78 equal.

Figure 11:
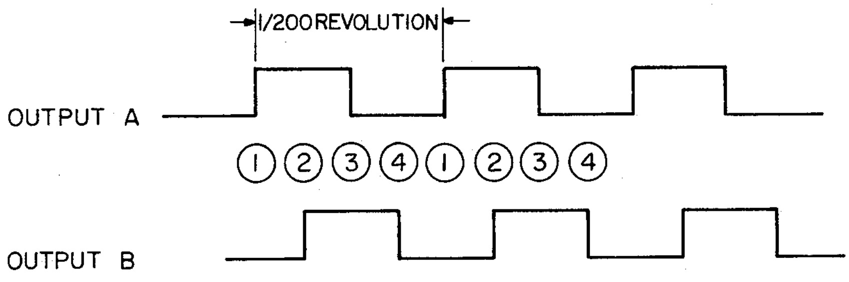
FIG. 11 is an illustration of theoutput of an encoder.

The motor 30 also drives an encoder 80, such as Trump-Ross, which generates two quadrature outputs at a rate of 200 per shaft revolution in phase quadrature as shown in FIG. 11, and drives the 40-tooth sprocket 28 which engages the tape 14.

From FIG. 11 it can be seen that there are 4 unique conditions within each cycle (1/200 revolution). By detecting the respective levels and directions of transitions, the direction of rotation may be determined. For instance, if output B is low and output A goes high, this is clockwise. If output B is low and output A goes low, this is counterclockwise. The following table lists the 4 unique conditions for each direction of rotation.

| CLOCKWISE | | | COUNTERCLOCKWISE | |
|---|---|---|---|---|
| A | B | | A | B |
| Goes High | Low | 1 | Goes Low | Low |
| High | Goes High | 2 | High | Goes Low |
| Goes Low | High | 3 | Goes High | High |
| Low | Goes Low | 4 | Low | Goes High |

Figure 12:
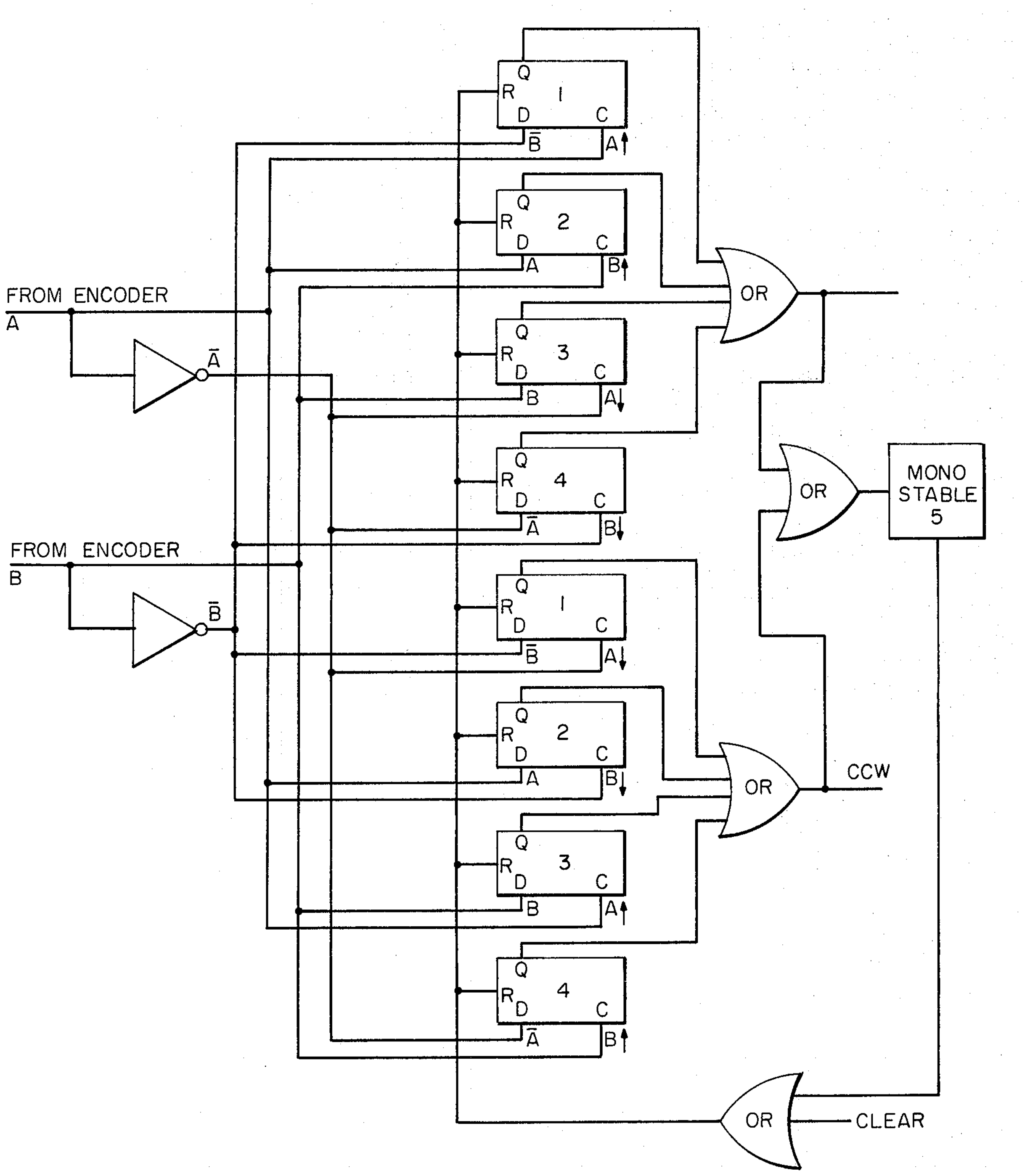
FIG. 12 is a schematic of a circuit employed to detect a change in direction of an encoder

The direction sense and X4 multiplier circuit 68 determines the direction of shaft rotation and effectively multiplies the encoder output by a factor of 4 by utilizing the relative phase of the quadrature outputs. The output of this circuit is two lines, either of which will be a pluse train at 800 pulses per shaft revolution depending on the direction of rotation. These are applied to reversing switch 66 which at this point is set to the count up condition causing the bidirectional counter 64 to increase its count and the digital-to-analog converter 70 to increase its output requiring the motor 30 to speed up more so the tachometer 78 will increase its output. This causes the motor to rapidly but smoothly accelerate to peak speed. The multiplier circuit 68 comprises eight D-type flip-flops which are arranged to detect the eight possible conditions outlined in the table above, and is schematically shown in FIG. 12. A line over the letter denotes a low level referred to thein-put and an arrow indicates the direction of change.

A clear signal is provided on power turn on and conditions all flip-flops 1–4 and 1–4 such that the Q outputs are all low. As an example, assume that clockwise condition 4 is occuring Since $\overline{A}$ is low, A is high and when B goes low, $\overline{B}$ goes high. This is proper to trigger the flip-flop labeled 4 in the clockwise portion. The Q output of this flip-flop goes through the 4 input or gate and generates a CW pulse. A monostable 5 resets flip-flop 4 within 200 nanoseconds and the next condition can now be detected. The result is a CW or CCW pulse generated at each unique condition shown in FIG. 11 according to the direction of rotation. This has also had the effect of multiplying the encoder output pulse rate by a factor of 4.

Figure 13:
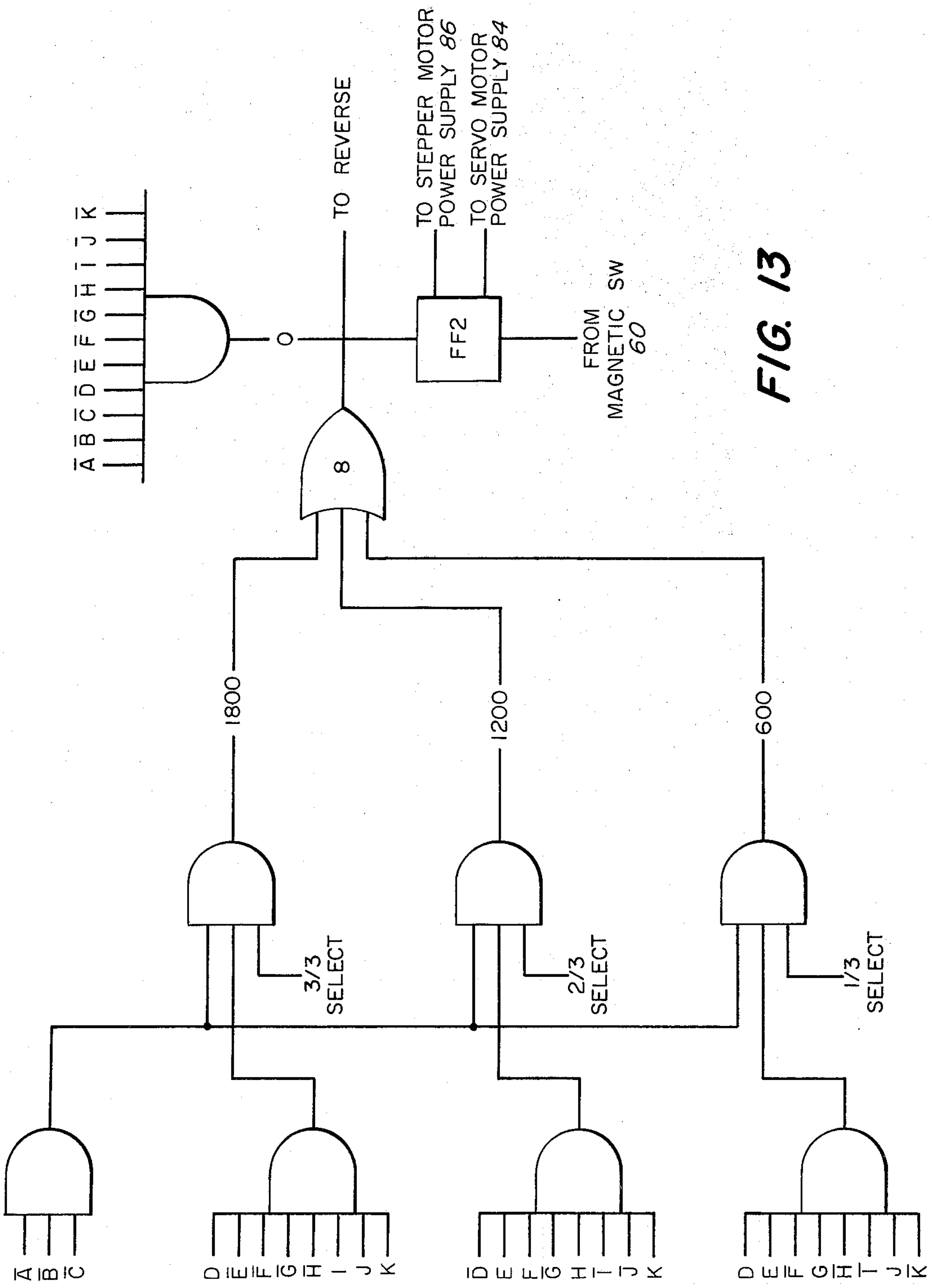
FIG. 13 is a schematic illustration of a circuit employed in a decoder.

A decoder 82 is arranged to monitor the state of the bidirectional counter 64 and signal when it is time to reverse the reversing switch 66. One of 3 conditions is decoded, depending on whether , , or 3/3 pick indexing is desired. For 3/3 pick the decoder looks for a count of 1,800 (decimal); for pick, 1,200; for pick, 600. FIG. 13 schematically shows the decoding gates. Following are the binary outputs of the counter 64.

| | | | For 1800 | For 1200 | For 600 |
|---|---|---|---|---|---|
| A | $2^0$ | 1 | | | |
| B | $2^1$ | 2 | | | |
| C | $2^2$ | 4 | | | |
| D | $2^3$ | 8 | 8 | | 8 |
| E | $2^4$ | 16 | | 16 | 16 |
| F | $2^5$ | 32 | | 32 | |
| G | $2^6$ | 64 | | | 64 |
| H | $2^7$ | 128 | | 128 | |
| I | $2^8$ | 256 | 256 | | |
| J | $2^9$ | 512 | 512 | | 512 |
| K | $2^{10}$ | 1024 | 1024 | 1024 | |
| | | TOTAL | 1800 | 1200 | 600 |

Therefore, to decode $1{,}800 = \overline{A}\ \overline{B}\ \overline{C}\ D\ \overline{E}\ \overline{F}\ \overline{G}\ \overline{H}\ I\ J\ K$ $1{,}200 = \overline{A}\ \overline{B}\ \overline{C}\ \overline{D}\ E\ F\ \overline{G}\ H\ \overline{I}\ \overline{J}\ K$ $600 = \overline{A}\ \overline{B}\ \overline{C}\ D\ E\ \overline{F}\ G\ \overline{H}\ \overline{I}\ J\ \overline{K}$ The select , , 3/3 signals are DC control levels from a selector switch on a control panel (not shown). The three possible outputs are combined in an "and" gate 8 to obtain the command to reverse the reversing switch. The circuit is also arranged to decode $\overline{ABCDEFGHIJK}$ which indicates the counter has reached a count of zero. When this occurs, the power to servo motor stops and the stepping motors are energized. The respective power supplies are shown at 84 and 86.

OPERATION

Weave pattern information is placed on 8-level computer paper tape by mechanical punch such as a model DC-1 Jr, Robins Industries Corp. in groups of 56 rows with 4 blank rows between groups. The tape 14 is taken from the supply reel assembly 12, threaded through the upper and lower needle guide plates 36 and 42, and received in the take-up reel 16. For threading, the tensing rollers 26 *a, b* and *c* are retracted. The teeth of the sprockets 20 *a, b,* and *c;* and the drive sprocket 28 engage the feed holes in the tape. The dc input to the decoder 82 will be at the 3/3 level or full pick.

In order to equal one pick of information, paper tape requires 168 rows. By separating each pick into three equal segments and allowing a small four-row loop between sections, it is possible to work with each section as if it were a separate segment. Further, by placing a positioning mechanism i.e. stepping motor at the center of each segment, the maximum total tolerance accumulation error occurring at each limit of the segment is only equal to 28 rows. This well within the allowable tolerance to insure proper repeater operation. The accumulated tolerance of between-row spacing of standard paper tape over 168 rows of data is excessive to permit the mechanical block reading. By grouping of these 168 rows into three segments and adding extra rows for the service loop between segments, the data is essentially separated into three independent groups. Each group is indexed at its midpoint, giving a total tolerance accumulation of 28 between-row spacings at the limits, which is small enough to permit block reading. As seen in FIG. 2 the Jacquard needles have been flexibly extended and as received in the upper guide plate 36 are formed into three groups of 448 needles each, for a total of 1,344, the number of needles in a Jacquard repeater, the 1,344 equaling one pick.

The initial calibration of the sprockets 20 *a, b, c,* and guide plates 36 and 42 is accomplished by the use of a master tape, standard format, engaged to the teeth of sprockets in the locked position. The guide plates are then moved until their perforations are aligned precisely with the holes in the tape and then secured.

The tape is positioned prior to the action of the continuous read/punch cycle of the repeater. The motor 30 is disabled and the stepping motors 22 *a, b*, and *c* and 24 which communicate with a standard ring counter 90, (Computer Devices, Inc.) are actuated. The stepping motors are stepped forwardly or backwardly by the ring counter, whose output is the stepper motor logic drive. The holes in the tape are precisely aligned with the perforations in the guide plates. When the repeater is activated, the needles 47–50 are allowed to drop.

In the present invention, referring to FIGS. 2 and 7, the needles 50 are at all times slideably received in the perforations 38 of the guide plate 36. When there is a hole in the tape 14, the needles 50 pass freely through the corresponding perforations in the plate 42. Subsequently, the punch drive block of the repeater drives rods or punches corresponding in position to the needles which have dropped to place a hole in the card being prepared. The punch drive block reverses its position, and the needles are withdrawn and are then ready for the next read/punch cycle when the tape has been indexed and positioned. This read/punch cycle is well known in the art.

After the initial read/punch cycle, the magnet on the flywheel 62 activates the magnetic switch 60, the position of the magnet effecting switch actuation just after the needles 50 have cleared the tape 14 at the completion of the read/punch cycle. This switch actuation commences the indexing and positioning of the tape 14 for the next read/punch cycle.

The switch 60 sets the counter 64 to a count of one and sets the reversing switch 66 for up-counting. At this time, the inputs to the reversing switch 66 are up pulses from the multiplier 68 and a forward input from FF-1, which is actuated by the magnetic switch 60. With the 3/3 pick selected, the decoder 82 looks for a count of 1,800. FF-2, FIG. 13, which is also actuated by the magnetic switch 60, switches off the stepper motor power supply 86 and switches on the servo motor power supply 84.

The output from the counter 64 is applied to the D/A converter 70 which applies its output to the summing circuit 72 and which output is a voltage proportional to the binary input of the counter 64. The output of the summing circuit is now no longere zero, and therefore the modulator 74 no longer has a 50% duty cycle.

The modulated signal is amplified and accelerates the servo motor 76 until the count reaches 1,800. The tachometer 78 coupled with the motor 30 generates an output voltage proportional to speed. This output voltage is applied to the summing circuit 72. The motor 30 drives the 40-toothed sprocket 28 which drives the tape 14; and the encoder 80. The 24-toothed sprockets 20 *a–c* are at this time idle and freely rotatable.

As previously discussed, the encoder 80 generates two quadrature outputs at a rate of 200 per shaft revolution, FIG. 11. The multiplier 68, FIG. 12, at this time provides an up pulse to the reverse switch 66.

One full pick is 180 rows of tape data, including tension loops. Four rows are allowed between each grouping to define the loops. The drive sprocket has 40 teech and it requires 4.5 revolutions of the drive sprocket to index one full pick or 180 rows. The encoder 80 generates 800 pulses per revolution or a total of 3,600 pulses in 4.5 revolutions.

The decoder 82, FIG. 13, in this illustration is conditioned to recognize a count of 1800. When the counter 64 reaches 1,800 the condition $\overline{A}\,\overline{B}\,\overline{C}\,D\,\overline{E}\,\overline{F}\,\overline{G}\,\overline{H}\,I\,J\,K$ exists and "AND" gate 8 provides an output to FF-1 in the reverse switch 66. (For and picks the decoder recognizes 1,200 and 600.) Reverse input to switch 66 provides a count down output, gate F, to the counter 64. As the count reduces, the D/A converter 70 output reduces causing the motor 30 to decelerate and come to rest at zero. The tape 14 at this point is indexed.

When the count reaches "0" the power to motor 30 is turned off and the power to stepping motors 22 a-c and 24 is turned on. When the count reaches zero, $\overline{A}\,\overline{B}\,\overline{C}\,\overline{D}\,\overline{E}\,\overline{F}\,\overline{G}\,\overline{H}\,\overline{I}\,\overline{J}\,\overline{K}$, an output from its AND gate activates power supply 86 and turns off power supply 84 via FF-2, FIG. 13. The stepping motors are variable reluctance types which generate no drag with no power applied but lock up within a few tenths of a degree when power is applied. They have four windings and therefore under any fixed excitation can lock up on any 60 increment. Therefore, the drive logic to them can remain unchanged since they always are required to lock up on 180 intervals which is a multiple of 60. Thus, when the stepping motors are activated, they lock into position, moving an amount necessary to position accurately the tape 14 until the read part of the cycle has been completed.

The positioning accuracy is maintained by the stepper motors inherent ability to very accurately repeat its position in reponse to power turn on. There is no accumulative tolerance build-up over many cycles of operation. After the stepping motors have been locked, the needles drop, the information is punched on the Card, and the needles withdrawn. Further rotation of the flywheel activates the magnetic switch 62 and the sequence repeats with the tape being indexed and positioned.

It should be understood that the indexing and positioning of the tape 14 is well within the time limits for the standard Jacquard repeater and no timing changes have to be effected to the repeater circuits controlling the read/punch cycle of the repeater.

Although described in reference to the sensing needles moving to probe the tape, the invention may be used in repeaters where the Card is moved relative to the needles, or where there is relative motion between the Card and the needles.

Having described my invention what I now claim is:

1. A Jacquard repeater head which comprises in combination:

a. means to introduce a roll of unpunched paper into the output side of the Jacquard repeater head;

b. a plurality of punches to punch a weave pattern on the unpunched paper;

c. a plurality of punch actuators adapted to drive the punches;

d. a striker to drive the actuators, the striker moving between a forward and a reverse position;

e. a plurality of first sensing needles engaged to the actuators, said needles arranged on an alternating offset relationship;

f. means secured to the first sensing needles to read a punched computer tape having uniformly aligned perforations;

g. means to move a punched computer tape of standard format through the repeater, the tape having weave information therein and to place the tape in information transfer relationship with the means secured to the first sensing needles; and h. means to control the timed relationship the movement of the tape, the transfer of the information, and the actuation of the punches.

2. The repeater head of claim 1, wherein the means to move the tape includes:

a. means to index the tape; and b. means to position the tape.

3. The repeater head of claim 2, wherein the means to index the tape includes a servo motor in combination with an encoder to provide controlled acceleration and deceleration of the tape.

4. The repeater head of claim 2, wherein the means to position the tape includes at least one stepping motor.

5. The repeater head of claim 1 wherein the means secured to the first sensing needles includes second sensing needles and said second sensing needles are flexibly secured to the first sensing needles.

6. The repeater head of claim 5 which includes at least a first guide means, disposed above the tape and having a pluralitiy of perforations therein, the perforations arranged on the standard format of punched computer tape and the second sensing needles are slideably received in the perforations.

7. The repeater head of claim 6 which includes second guide means spaced apart from the first guide means to allow for the movement of the tape between the first and second guide means and the second guide means having a plurality of perforations therein, the perforations of the second guide means in register with the perforations of the first guide means.

8. The repeater head of claim 7 which includes a third guide means, said third guide means spaced apart from the first guide means and having a plurality of perforations therein, the perforations arranged on an alternating offset pattern, and the first sensing needles are slideably received therein.

9. The repeater head of claim 7 wherein the perforations of the first and second guide means are divided into three groups and means to tension the tape are interposed between the first and second, second and third and subsequent to the third group.

10. The repeater head of claim 9 which includes means to index the tape comprising a servo motor in combination with a drive sprocket, the drive sprocket engaging the tape.

11. The repeater head of claim 10 which includes means to accelerate and decelerate the tape.

12. The repeater head of claim 10 which includes means to position the tape said means including a stepping motor and sprocket, the sprocket adapted to engage the tape.

13. The repeater head of claim 12 which includes three stepping motors and sprockets, the lower guide means has three slots therein, each slot centrally positioned within a group of perforations, the sprockets rotatably received in the slots.

* * * * *

UNITED STATES PATENT AND TRADEMARK OFFICE

CERTIFICATE OF CORRECTION

PATENT NO. : 3,918,633

DATED : Nov. 11, 1975

INVENTOR(S) : Gottfried Maurer

It is certified that error appears in the above-identified patent and that said Letters Patent are hereby corrected as shown below:

Col. 2, line 23, "press" should be --pass--;

Col. 5, line 48, "1-4" (second occurrence) should be -- 1'-4' --.

Col. 5, line 64, after "whether" insert --1/3,2/3--;

Col. 5, line 66, after "for" (first occurrence) insert --2/3--;

Col. 5, line 66, after "for" (second occurrence) insert --1/3--;

Col. 6, line 19, after "select" insert --1/3,2/3 and--;

Col. 7, line 48, "longere" should be --longer--;

Col. 8, line 5, after "for" insert --2/3-- and after "and" insert --1/3--;

Col. 8, line 23, "60" should be --60°--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*